United States Patent [19]
Karayannis et al.

[11] 3,962,203
[45] June 8, 1976

[54] DECHLORINATION OF HIGH YIELD POLYOLEFINS USING NEUTRAL PHOSPHORYL ESTERS

[75] Inventors: Nicholas M. Karayannis; Habet M. Khelghatian, both of Naperville; John S. Skryantz, Aurora, all of Ill.

[73] Assignee: Standard Oil Company, Chicago, Ill.

[22] Filed: Dec. 19, 1974

[21] Appl. No.: 534,189

[52] U.S. Cl. .............................. 528/486; 528/487; 526/12; 526/19; 526/348; 526/351; 526/352
[51] Int. Cl.² .......................... C08F 6/00; C08F 6/28
[58] Field of Search ............... 450/768; 260/94.9 F, 260/93.7, 88.2 R, 88.2 S

[56] References Cited
UNITED STATES PATENTS 3,090,777   5/1963   Antonsen et al. ................... 260/93.7
3,254,041   5/1966   De Pierri .............................. 260/23
3,331,806   7/1967   Fior et al. ............................ 260/41

FOREIGN PATENTS OR APPLICATIONS 842,351   5/1970   Canada ..................... 260/94.9 UX Primary Examiner—Stanford M. Levin
Attorney, Agent, or Firm—Reed F. Riley; Arthur G. Gilkes; William T. McClain

[57] ABSTRACT

Lower alkyl, neutral phosphoryl esters are disclosed herein as effective materials to reduce deleterious chloro compound concentrations in polyolefins and compositions based thereon, which polyolefins and compositions are produced in bulk or vapor-phase processes using high yield catalysts in which catalyst residues and solubles need not be removed prior to processing.

14 Claims, No Drawings

DECHLORINATION OF HIGH YIELD POLYOLEFINS USING NEUTRAL PHOSPHORYL ESTERS

SUMMARY OF THE INVENTION

A novel process is disclosed herein which allows the substantially complete dechlorination of bulk or vapor-phase polyolefins which process involves admixing a neutral phosphoryl ester with the polyolefin after separation of the polymer from the polymerization step and prior to polymer processing and, more specifically, the inventive process involves admixing at least one lower alkyl, neutral phosphoryl ester in an effective, controlled amount with a polyolefin, generally in conjunction with other additives, such mixing generally occurring after the catalyst decomposition step or steps and prior to the extrusion and pelleting steps in the commercial polyolefin process.

In accordance with the instant invention, one or more compounds of the type, $(RO)_3PO$, $(RO)_2RPO$ or $(RO)R_2PO$, wherein R may be alkyl, alkaryl or aryl, and all R in a single compound need not be the same, i.e. $(RO)(R'O)_2PO$, $(RO)_2R'PO$, $(RO)(R'O)RPO$, etc., is added in a small, effective amount, optionally with other additives, to a polyolefin produced by a process wherein use of a high yield, low solubles catalyst makes catalyst decomposition product and solubles removal from the product polyolefin unnecessary, i.e. bulk phase or vapor phase processes, to substantially completely dechlorinate the polyolefin after the catalyst decomposition step or steps and prior to commercial utilization of the polymer.

BACKGROUND OF THE INVENTION

Second-generation polyolefin production processes (e.g., bulk and vapor phase polypropene) are economically attractive when polymer yields are high enough and solubles (hexane extractables) are low enough to make catalyst residues and solubles removed unnecessary. The presence of catalyst residues in the polymer product results in a relatively high chlorine compound content in the product. Thus, for example, the polypropene from a 4000 lbs/lb titanium trichloride polymerization process, prepared by a catalyst consisting of diethylaluminum chloride and active titanium trichloride in about a 3:1 molar ratio, can contain above about 300 ppm of chlorine as chloride. This chloride, which is present in the form of metal chlorides, is hydrolyzed during the catalyst deactivation step or steps to yield hydrogen chloride. The latter can cause degradation of the polymer product during extrusion, molding, etc., if not properly neutralized. There are several conventional methods of neutralizing the hydrogen chloride in the polymer, e.g., addition of calcium hydroxide leads to the formation of calcium chloride while addition of propene oxide results in the formation of propene and chlorohydrins. In the former case the chlorine remains in the polymer in the form of calcium chloride, whereas in the latter case a fraction of the chloride is removed during drying or storage of the powder (the b.p. of propene chlorohydrins is 125°–130°C).

Now we have found compounds superior in their effectiveness for chlorine removal, the residual effects of which compounds are negligible on the polyolefin when the dechlorinated polymer is being processed.

STATEMENT OF THE INVENTION

Compounds useful for the instant invention are generally neutral, lower alkyl phosphoryl esters and, more specifically, are lower alkyl, neutral esters of phosphorous of formulae:

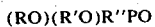
or

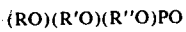

where R, R' and R'' may be the same or different, at least one RO group must be lower alkyl (one to about six carbon atoms) and the remaining R, R' and R'' can be alkyl, alkaryl or aryl. More preferably, at least one RO, R'O or R''O is methoxy and the remaining R, R' and R'' are alkaryl, aryl or lower alkyl.

It is thought that the dechlorination involves the splitting out of alkyl chloride by reaction of only one of the alkoxy groups of the neutral phosphoryl ester with the metal chloride catalyst decomposition products, e.g.:

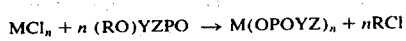

where Y and Z may be RO or R. The thermal stability of such products, $M(OPOYZ)_n$ or bridged variants thereof, is high particularly when Y and Z are both R groups rather than one or both being RO radicals.

In the RCl compound of the above equation R is lower alkyl; more preferably methyl, for the following reasons:

a. Methyl chloride is the most volatile of such compounds which favors dechlorination of the polyolefin during lower temperature or even ambient polymer processing.

b. Ethyl and higher alkyl chlorides partially decompose to hydrogen chloride and the corresponding alkene at elevated temperatures in the presence of metal salts likely to remain behind in the polymer product.

The most suitable compounds are thus methyl esters of phosphoric acid, alkyl- or arylphosphonic acids, dialkyl-, diaryl- or aryl alkylphosphinic acids, aryl- or diarylphosphoric acids, etc.

The polyolefin, or copolymer thereof using an ethene or 1-alkene having three to about eight carbon atoms comonomer, used in the herein disclosed process are as aforesaid bulk phase or vapor phase polyolefins or compositions based thereon made by catalysts which have high enough yields so as not to require separation of the catalyst decomposition products or solubles (lower molecular weight and amorphous polymers) prior to commercial use. Such polyolefins include ethene, propene, butene-1, 4-methylpentene-1, and other $C_2$ to $C_8$ polymerizable monomers. Thus, such polyolefins and compositions generally contain above about 100 ppm of chlorine as chloride and above about 1 weight percent of hot hexane solubles depending upon the polyolefin.

The lower alkyl, neutral phosphoryl esters are generally employed in an amount sufficient to reduce chloride in the polyolefins to below about 50 ppm. more preferably, below about 25 ppm and, most preferably, below about 10 ppm. In terms of weight percent of some lower alkyl, neutral phosphoryl esters used for polypropene or compositions based thereon, this corresponds to addition of an amount of $(MeO)_3PO$ of above about 0.04 weight percent, more preferably above about 0.15 weight percent and, most preferably, above about 0.25 weight percent. For $(MeO)(C_6H_5O)PO$, the corresponding amounts are above about 0.08 weight percent, more preferably, above about 0.30 weight percent, and, most preferably, above about 0.50 weight percent. Amounts more than about 100 percent of the stoichiometric amount of neutral ester (see the above equation) generally need not be used as it is economically detractive and larger excesses can, under certain conditions, themselves have deleterious effects on the polymer during processing as can be understood by one skilled in the art.

Favorably, the esters are intimately admixed with solid or liquid polyolefin (conventional or melt finishing) after the catalyst decomposition step or steps, such catalyst decomposition step or steps typically use water, a methanol-water alkali mixture or a methanol-methoxide-water mixture. Other conventional additives such as stabilizers and colorants may and preferably are added either jointly or subsequently to the step or steps involving the use of the catalyst decomposition agent or agents.

Such stabilizers include the following. Jonwax-12, J-12, is a pentaerythritol monostearate and is a Trademark of S. C. Johnson & Sons, Inc., Racine, Wis. Advastab Z-7 is a Trademark of Cincinnati Milacron Chemicals, Inc. and is organozinc compound. Argus Mark OTM is a Trademark of the Argus Chemical Corp., Brooklyn, N.Y. and is a di-n-octyltin S,S'-bis-(isooctylmercaptoacetate). Thermolite 813, T-813, is a Trademark of M & T Chemicals, Inc., Rahway, N.J. and is a di-n-octyltin maleate. Weston 618 is a Trademark of Weston Chemicals, Inc., a division of Borg-Warner Corp., Chicago, Ill. and is cyclic neopentanetetrayl-bis-(octadecyl phosphite). Goodrite 3114, G-3114, is a Trademark of the B. F. Goodrich Corp., Cleveland, Ohio and is 1,3,5-tris(3,5-di-t-butyl-4-hydroxytolyl) isocyanurate. B.H.T. is 3,5-di-t-butyl-4-hydroxytoluene. Calcium and zinc stearates are stabilizer grade materials which are purchasable generally. Mark X, Mark 224, Mark 292 and Mark 308 are Trademarks of the Argus Chemical Corp., Brooklyn, N.Y. and are proprietary, an organic epoxide, an organotin compound, and an organic phosphite, respectively. Drapex-6.8 is a Trademark of the Argus Chemical Corp., Brooklyn, N.Y. and is an organic epoxide. $V_4$ and 10-1156 are proprietary stabilizer packages of Amoco Chemicals Corporation, Chicago, Ill.

While the invention is described in connection with the specific Examples below, it is to be understood that these are for illustrative purposes only. Many alternatives, modifications and variations will be apparent to those skilled in the art in the light of the below Examples and such alternatives, modifications and variations fall within the scope and spirit of the appended claims.

GENERAL EXPERIMENTAL PROCEDURE

Yellowness and brightness determinations were made using ASTM test No. D-1928. Melt flow rate determinations were made using ASTM test No. D-1238 (Cond. G).

Oven stability at 300°F. or 320°F. is conducted on injection molded discs of 2¼ inch diameter and ⅛ inch thickness which discs are made using a mini injection molder operated at 465°F. Failure of a disc is given in hours at the point where 10 percent of the surface of the test disc shows substantial darkening and powdering.

Corrosivity was determined by either exposing the polyolefin powder or pellets to ¾ × 2 strips of mild, cold rolled, 20 gauge steel and stored under acetone after cutting. The test contacts the powder or pellet with the steel strip for fifteen minutes at 260° ± 5°C. Corrosion is indicated by light grey or delustered areas on the surface of the strip.

Bulk polypropene products HPB-72, HPB-75, HPB-76, HPB-71-4/5, HPB-92 HPB-93-22 are bulk phase polypropenes having melt flow rates of about two to about six made using diethylaluminum chloride and active titanium trichloride and generally have chloride contents above about 300 ppm and hot hexane solubles above about 3.5 weight percent. Bulk product HPB-109-7 and HPB-11018 are bulk phase polypropenes made using a similar catalyst system and have above about 125 ppm chloride and above about 2 weight percent hot hexane solubles. Chloride was determined by x-ray fluorescence spectroscopy and solubles by hot hexane extraction.

Subsequent to polymerization the bulk polypropenes used were deactivated (wet nitrogen at 160°F), admixed with the ester and stabilizers, if used, blended, extruded at 420°F and pelletized. Such pellets were then molded into plaques for the yellowness, brightness and oven stability tests or used directly for the pellet corrosivity test. Powder corrosivity tests were run on the material prior to the extrusion step above.

Abbreviations are: TMPh, trimethylphosphate; DMMP, dimethyl methylphosphonate; MDPP, methyldiphenylphosphate.

EXAMPLE I

| Polypropene | Ester And Other Additives** | Chlorine Content After Treatment (PPM) |
| --- | --- | --- |
| HPB-91 | Control | 344 |
|  | 0.25% J-12, 0.2% TMPh, 0.05% Ca(OH)$_2$, 0.7% V-4 | 7, 3* |
|  | 0.2% TMPh, 0.05% ca(OH)$_2$, 0.7% V-4 | 3, 3* |
|  | 0.2% TMPh, 0.7% V-4 | 26 |
|  | 0.2% TMPh, 0.025% OTM, 0.7% V-4 | 43 |
|  | 0.2% DMMP, 0.25% OTM, 0.07% V-4 | 22 |
|  | 0.2% MDPP, 0.25% OTM, 0.7% V-4 | 158 |
|  | 0.2% trimethylphosphite, 0.025% OTM, 0.7% V-4 | 206 |
|  | 0.2% dimethylsulfite, 0.025% OTM, 0.7% V-4 | 371 |
|  | 0.2% TMPh, 0.1% Ca-Zn stearates (1:1 w/w), 0.7% V-4 | 5 |
| HPB-76 | Control | 655 |
|  | 0.25% J-12, 0.05% Ca(OH)$_2$, 0.7% V-4 | 651 |
|  | 0.25% J-12, 0.2% propylene oxide, 0.7% V-4 | 449 |
|  | 0.25% J-12, 0.25% THPh, 0.7% V-4 | 25 |

EXAMPLE I-continued

| Polypropene | Ester And Other Additives** | Chlorine Content After Treatment (PPM) |
|---|---|---|
| | 0.25% J-12, 0.25% dimethyl carbonate, 0.7% V-4 | 570 |

*Duplicate determinations
**All percentages are weight percents

EXAMPLE II

| Ester And Other Additives**** | Yellowness, Percent | Brightness, Percent |
|---|---|---|
| 0.2% TMPh, 0.025% OTM, 0.7% V-4* | 10.4 | 65.0 |
| 0.2% trimethylphosphite, 0.025% OTM, 0.7% V-4* | 17.9 | 62.6 |
| 0.2% DMMP, 0.025% OTM, 0.7% V-4* | 9.0 | 64.3 |
| 0.2% MDPP, 0.025% OTM, 0.7% V-4* | 8.4 | 65.2 |
| 0.2% TMPh, 0.1% Ca-Zn stearates (1:1), 0.7% V-4* | 8.8 | 64.9 |
| 0.2% TMPh, 0.025% OTM, 0.7% V-4** | 7.2 | 64.8 |
| 0.2% DMMP, 0.025% OTM, 0.7% V-4** | 6.7 | 63.9 |
| 0.2% TMPh, 0.05% Mark 308, 0.7% V-4** | 7.0 | 65.5 |
| 0.2% TMPh, 0.05% Drapex-6.8, 0.7% V-4** | 7.9 | 65.0 |
| 0.2% TMPh, 0.025% OTM, 0.05% Mark 308, 0.7% V-4** | 6.8 | 64.8 |
| 0.2% TMPh, 0.05% Mark X, 0.7% V-4* | 9.9 | 64.7 |
| 0.2% TMPh, 0.05% Mark 292, 0.7% V-4* | 9.5 | 65.0 |
| 0.2% TMPh, 0.05% Advastab Z-7, 0.7% V-4* | 11.8 | 64.4 |
| 0.2% TMPh, 0.05% Weston 618, 0.7% V-4* | 10.5 | 64.8 |
| 0.2% TMPh, 0.05% Mark 224, 0.7% V-4* | 11.0 | 64.7 |
| 0.2% DMMP, 0.1% Ca-Zn stearates (1:1), 0.7% V4*** | 9.9 | 64.6 |
| 0.2% DMMP, 0.1% Ca-Zn stearates (1:1), 0.1% BHT, 0.15% G-3114*** | 6.0 | 64.9 |
| 0.35% MDPP, 0.1% Ca-Zn stearates (1:1), 0.1% BHT, 0.15% G-3114*** | 9.2 | 64.3 |
| 0.2% DMMP, 0.05% Mark 292, 0.1% BHT, 0.15% G-3114*** | 6.0 | 65.6 |
| 0.2% DMMP, 0.025% OTM, 0.1% BHT, 0.15% G-3114*** | 6.2 | 65.6 |

*Bulk product HPB-91.
**Bulk product HPB-71-4/5.
***Bulk product HPB-93.
****All percentages are weight percents.

EXAMPLE III

OVEN STABILITY DATA (320°F) FOR POLYPROPENE SAMPLES

| Polypropene | Ester And Other Additives** | Failure After (hours)* |
|---|---|---|
| HPB-75 | 0.25% J-12, 0.2% TMPh, 0.05% Ca(OH)₂, 0.7% V-4 | 454,550 |
| HPB-75 | 0.2% TMPh, 0.05% Ca(OH)₂, 0.7% V-4 | 335,390 |
| HPB-72 | 0.2% TMPh, 0.7% V-4 | 310,454 |
| HPB-72 | 0.2% TMPh, 0.025% OTM, 0.7% V-4 | 454,556 |
| HPB-72 | 0.2% TMPh, 0.05% T-813, 0.7% V-4 | 604,646 |
| HPB-72 | 0.2% TMPh, 0.025% OTM, 0.1% Ca-Zn stearates (1:1), 0.7% V-4 | 430,430 |
| HPB-72 | 0.2% TMPh, 0.05% T-813, 0.1% Ca-Zn stearates (1:1), 0.7% V-4 | 556,646 |
| HPB-91 | 0.2% TMPh, 0.025% OTM, 0.7% V-4 | 352,376 |
| HPB-91 | 0.2% trimethylphosphite, 0.025% OTM, 0.7% V-4 | 448,448 |
| HPB-91 | 0.2% DMMP, 0.025% OTM, 0.7% V-4 | 280,328 |
| HPB-91 | 0.2% MDPP, 0.025% OTM, 0.7% V-4 | 328,360 |
| HPB-91 | 0.2% dimethylsulfite, 0.025% OTM, 0.7% V-4 | 136,160 |
| HPB-91 | 0.2% TMPh, 0.1% Ca-Zn stearates (1:1), 0.7% V-4 | 328,448 |
| HPB-71-4/5 | 0.2% TMPh, 0.025% OTM, 0.7% V-4 | 448,448 |
| HPB-71-4/5 | 0.2% DMMP, 0.025% OTM, 0.7% V-4 | 496,552 |
| HPB-71-4/5 | 0.2% TMPh, 0.05% Mark 308, 0.7% V-4 | 448,448 |
| HPB-71-4/5 | 0.2% TMPh, 0.05% Drapex-6.8, 0.7% V-4 | 448,496 |
| HPB-71-4/5 | 0.2% TMPh, 0.025% OTM, 0.05% Mark 308, 0.7% V-4 | 472,520 |
| HPB-91 | 0.2% TMPh, 0.05% Mark 224, 0.7% V-4 | 448,448 |
| HPB-93-22 | 0.2% DMMP, 0.1% Ca-Zn stearate (1:1), 0.7% V-4 | 476,476 |

*Two plaques were examined in each case.
**All percentages are weight percents

EXAMPLE IV

CORROSIVITY DATA FOR VARIOUS STABILIZER FORMULATIONS IN HIGH-YIELD POLYPROPENES

| Polypropene | Ester and other Additives | Degree of* Corrosion |
|---|---|---|
| HPB-109-7 | 0.9%, 10-1156 | 3 |
| HPB-109-7 | 0.05% Ca(OH)₂, 0.9% 10-1156 | 0 |
| HPB-109-7 | 0.125% J-12, 0.05% Ca(OH)₂, 0.9% 10-1156 | 1 |
| HPB-110-18 | 0.25% J-12, 0.1% PO, 0.9% 10-1156 | 1− |
| HPB-110-18 | 0.15% DMMP, 0.9% 10-1156 | 0 |
| HPB-110-18 | 0.25% J-12, 0.05% Ca(OH)₂, 0.9% 10-1156 | 0 |

EXAMPLE IV-continued

CORROSIVITY DATA FOR VARIOUS STABILIZER FORMULATIONS IN HIGH-YIELD POLYPROPENES

| Polypropene | Ester and other Additives | Degree of* Corrosion |
|---|---|---|
| HPB-110-18 | 0.25% J-12, 0.035% Ca(OH)$_2$, 0.9% 10-1156 | 1+ |

*Corrosion degree is defined as follows:
0 - none
1 - slight
2 - medium
3 - severe

What is claimed is:

1. A process comprising the steps of:
   a. admixing polyolefin containing a metal chloride catalyst residue, which polyolefin is made using at least one 1-alkene containing between two and eight carbon atoms by a bulk phase or vapor phase polymerization process, with an effective amount of at least one compound selected from the group consisting essentially of (RO)R'R''PO and (RO)(R'O)R''PO wherein R, R' and R'' are the same or different, at least one RO group is a methoxy group, and the remaining R, R' and R'' are one to about six carbon atom alkyl, alkaryl or aryl radicals; and
   b. treating the result of step (a) such that said polyolefin and said compound react to produce a polymeric product substantially free of said metal chloride catalyst residue.

2. The process of claim 1 wherein one or more compounds selected from the group consisting of calcium hydroxide, calcium stearate and zinc stearate is admixed with said polyolefin.

3. The process of claim 1 wherein said compound is (CH$_3$O)$_2$CH$_3$PO.

4. The process of claim 1 wherein said compound is (CH$_3$O)(C$_6$H$_5$O)$_2$PO.

5. The process of claim 2 wherein said compound is (CH$_3$O)$_2$CH$_3$PO.

6. The process of claim 2 wherein said compound is (CH$_3$O)(C$_6$H$_5$O)$_2$PO.

7. The process of claim 1 wherein said polyolefin is polypropene.

8. The process of claim 1 wherein said polyolefin is polyethene.

9. The process of claim 2 wherein said polyolefin is polypropene.

10. The process of claim 2 wherein said polyolefin is polyethene.

11. The process of claim 3 wherein said polyolefin is polypropene or polyethene.

12. The process of claim 4 wherein said polyolefin is polypropene or polyethene.

13. The process of claim 5 wherein said polyolefin is polypropene or polyethene.

14. The process of claim 6 wherein said polyolefin is polypropene or polyethene.

* * * * *

UNITED STATES PATENT OFFICE
CERTIFICATE OF CORRECTION

Patent No. 3,962,203      Dated June 8, 1976

Inventor(s) Karayannis, Nicholas M., Khelghatian, Habet M. ~~Skryantz, John S.~~

It is certified that error appears in the above-identified patent and that said Letters Patent are hereby corrected as shown below:

Column 1, line 41 "removed" should be -- removal

"    2, " 18 "RO." should be -- RO,

"    3, " 20 "methanol-water alkali" should be -- methanol-water-alkali

"    4, " 22 "3/4 x 2 strips" should be -- 3/4" x 2" strips

" 3,4, Ex.1 last line of page    "THPh" should be -- TMPh

Signed and Sealed this

Fifth Day of October 1976

[SEAL]

Attest:

RUTH C. MASON  
Attesting Officer

C. MARSHALL DANN  
Commissioner of Patents and Trademarks